United States Patent [19]

Hatakeyama et al.

[11] Patent Number: 4,697,992
[45] Date of Patent: Oct. 6, 1987

[54] PISTON RING FOR A PISTON IN A REFRIGERANT COMPRESSOR

[75] Inventors: Hideharu Hatakeyama; Hidenao Takahashi, both of Isesaki, Japan

[73] Assignee: Sanden Corporation, Gunma, Japan

[21] Appl. No.: 828,676

[22] Filed: Feb. 12, 1986

[30] Foreign Application Priority Data

Feb. 20, 1985 [JP] Japan .......................... 60-21904[U]

[51] Int. Cl.⁴ .......................... F01B 31/10; F04B 1/18; F16J 9/20; F16J 9/28
[52] U.S. Cl. ........................... 417/269; 92/159; 92/172; 92/251; 277/173; 277/177; 277/206 R
[58] Field of Search ................ 92/172, 193, 251, 159; 277/216, 217, 206 R, 173, 177; 417/269

[56] References Cited

U.S. PATENT DOCUMENTS

| 254,736 | 3/1882 | Van Tint | 277/206 R X |
| 2,738,106 | 2/1957 | Barnhart | 277/206 R X |
| 3,359,872 | 12/1967 | Foster | 92/172 |
| 3,727,927 | 4/1973 | Packard | 277/216 |
| 3,831,952 | 8/1974 | Geffroy | 277/216 X |
| 3,851,889 | 12/1974 | Nisper | 277/216 X |
| 3,885,460 | 5/1975 | Park | 277/178 X |
| 4,432,925 | 2/1984 | Holzberg et al. | 277/216 X |
| 4,479,670 | 10/1984 | Gabler | 277/206 R X |
| 4,480,964 | 11/1984 | Skinner | 417/222 |
| 4,594,055 | 6/1986 | Hatakeyama et al. | 417/269 |

FOREIGN PATENT DOCUMENTS 580393 11/1977 U.S.S.R. .................. 277/216

*Primary Examiner*—Allan N. Shoap
*Attorney, Agent, or Firm*—Banner, Birch, McKie & Beckett

[57] ABSTRACT

A refrigerant compressor includes a piston with two circumferential grooves on the outer surface of the piston, one of the grooves being located near the top and the other near the bottom. Conical piston rings made of plastic are disposed in the grooves. The piston rings, which have an outer diameter greater than that of the piston, have a curved surface shaped so that the outer diameter of the curved surface at one axial end of the piston ring is smaller than that at the other axial end. This unique arrangement of the curved conical seals reduces the loss of horsepower in motor driven refrigerant compressors by providing improved sealing between the piston and cylinder.

5 Claims, 7 Drawing Figures

PISTON RING FOR A PISTON IN A REFRIGERANT COMPRESSOR

TECHNICAL FIELD

The present invention is directed to a refrigerant compressor, and more particularly, to a piston type refrigerant compressor with an improved piston ring.

BACKGROUND OF THE INVENTION

In conventional piston type refrigerant compressors, pistons reciprocate in cylinders which are generally made of iron casting. Iron casting is utilized because iron is durable and resists abrasion. These characteristics of iron have been especially important in the case of a compressor for an automotive air conditioning system. Generally, iron cylinders, or alternatively a cylinder liner made of iron casting, are inserted into a casing made of an aluminum alloy.

When a cylinder or cylinder liner made of iron casting is used in a compressor, the weight of the cylinder or cylinder liner cannot be decreased more than a certain amount. The cylinder or cylinder liner must be more than a certain thickness to achieve sufficient strength to avoid any deformation when the cylinder liner is inserted in the casing. The cylinder or cylinder liner also must be thick enough to prevent the cylinder liner from undergoing heat deformation. However, when the cylinder liner is made sufficiently thick to achieve the above advantages, the weight of the casing including the cylinder liner is larger than desired. Also, since the above type cylinder liner involves two manufacturing steps, i.e., manufacturing a separate iron cast cylinder liner followed by the assembly of the cylinder liner and casing, the manufacturing cost is high.

To resolve the above mentioned problems, cylinder liners have been made of the same aluminum alloy used in the casing. However, the use of an aluminum alloy in the cylinder liner makes it difficult to use piston rings in the compressor. Piston rings generally are disposed on the outer surface of the pistons to improve the seal between the cylinder chamber and crank chamber of the compressor. Piston rings generally cannot be used in cylinder liners made of an aluminum alloy, because piston rings generally have high hardness as compared to the hardness of aluminum cast cylinder liners. Hard piston rings damage the softer aluminum cylinder liner.

Referring to FIG. 6, a portion of a wobble plate type compressor is shown. Piston 16', which is connected to connecting rod 15', piston ring 17' and cylinder liner 19' are shown. In a wobble plate type compressor, piston 16' does not reciprocate perfectly, as depicted by the slightly slanted position of the piston in FIG. 6, because connecting rod 15' connected to piston 16' does not remain parallel with the center line of cylinder liner 19' throughout its cycle. Side pressure F is produced on outer surface 18' of piston 16' to force the bottom end of piston 16' toward cylinder liner 19'. Accordingly, the side surface of piston 16' can contact the cylinder liner and damage the liner during reciprocation of the piston.

To improve upon the above problems, an improved piston construction was previously proposed in Japanese Utility Model Application No. 58-197942 corresponding to U.S. application Ser. No. 684,332, now U.S. Pat. No. 4,594,055, issued June 10, 1986, which is assigned to the same assignee as the present application. In the '942 application, two grooves are formed on the outer surface of a piston at the top and bottom thereof. Piston rings, which are made of plastic and conical in shape, are disposed in those grooves. Although the inclination of the piston is resolved by the above construction, the edges of the piston rings still can slide on the surfaces of the cylinder liners causing abrasion between the piston rings and the cylinder liner.

SUMMARY OF THE INVENTION

It is the primary object of the present invention to provide a piston for a refrigerant compressor having a piston ring which avoids abrasion due to its specially designed curved shape.

It is another object of the invention to provide a piston ring for a piston for a refrigerant compressor which improves sealing. In particular, in a variable speed compressor operating in the range between low and middle speed, it is an object of this invention to improve the sealing effectiveness of the piston ring to thereby improve capacity by providing a piston ring with a specially designed curved shape.

Another object of the present invention is to improve the performance of a refrigerant compressor, particularly a variable speed compressor operating at high speed and high pressure, by providing an improved piston ring having a curved shape which enables it to be responsive to such high speeds and high pressure conditions. In this regard, in the case of a motor driven refrigerant compressor operating at high speed and high pressure, it is an object of this invention to reduce loss of horsepower to the motor.

A further object of the present invention is to provide piston rings for the pistons of a piston type compressor which are very thin as compared to conventional piston rings thereby reducing cost.

It is an object of this invention to provide a piston ring having a curved design which makes it easier to manufacture the piston ring from plastic materials and easier to install the piston rings because of their ability to stretch.

A refrigerant compressor includes a piston with two circumferential grooves on the outer surface of the piston, one of the grooves being located near the top and the other near the bottom. Conical piston rings made of plastic are disposed in the grooves. The piston rings, which have an outer diameter greater than that of the piston, have a curved surface shaped so that the outer diameter of the curved surface at one axial end of the piston ring is smaller than that at the other axial end.

Further objects, features and other aspects of the invention will be understood from the following detailed description of the preferred embodiments of the invention referring to the attached drawings.

DETAILED DESCRIPTION OF THE PREFERRED EMBODIMENTS

Figure 5:
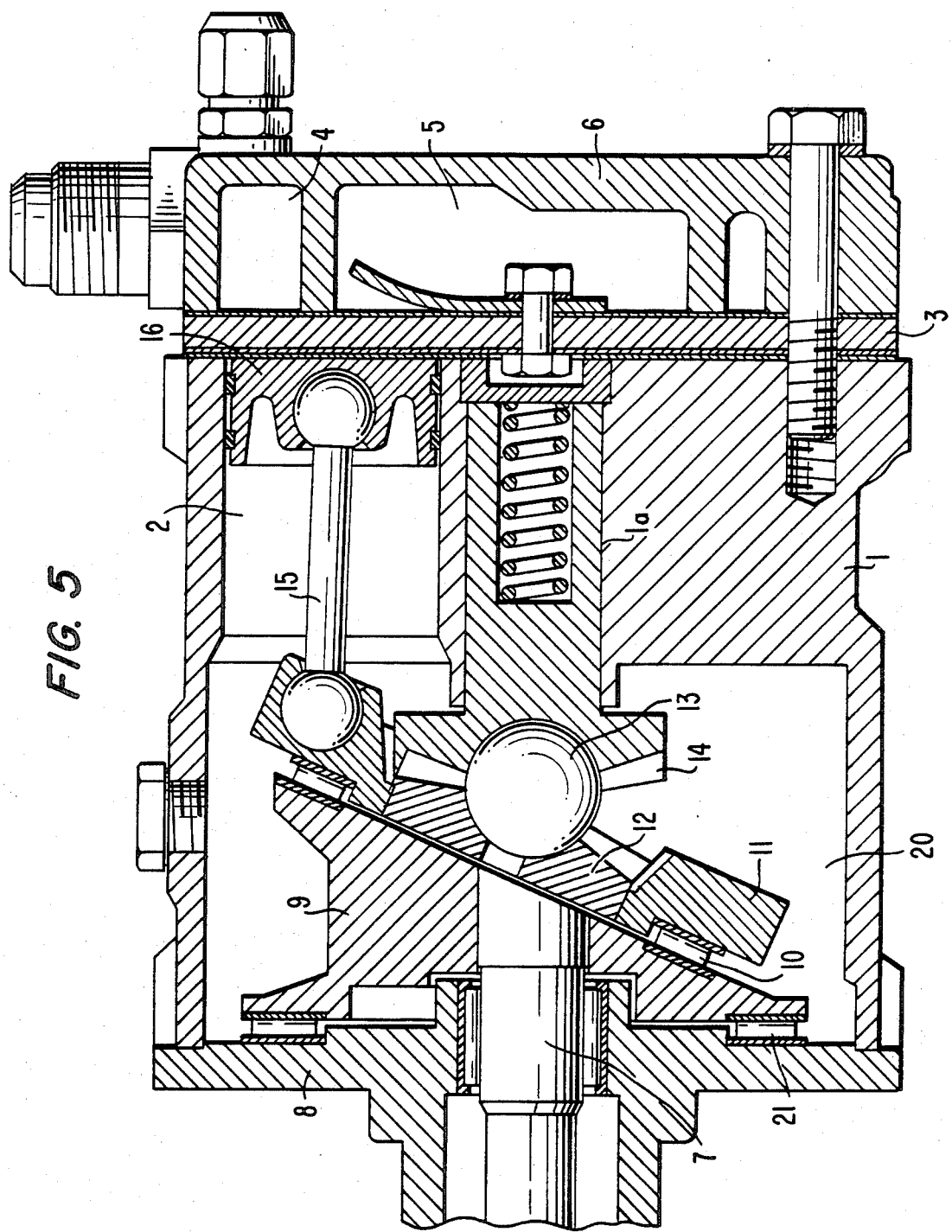
FIG. 5 is a cross-sectional view of a piston type refrigerant compressor in accordance with the present invention.

Referring to FIG. 5, a wobble plate type compressor is shown which includes cylindrical casing 1 made of an aluminum alloy, cylinder head 6 connected to one end of casing 1 through valve plate 3 and front housing 8 connected to the other end of casing 1. Plural cylinders 2 are radially disposed around the axis of the compressor at equal angles. Valve plate 3 is adjacent to open ends of cylinders 2 in casing 1. Suction chamber 4 and discharge chamber 5 are formed in cylinder head 6. Drive shaft 7 is centrally supported by front housing 8 which is attached to the front end of casing 1 opposite the open ends of cylinders 2. Wedge shaped rotor 9 is attached to the inner end of drive shaft 7 and supported in an axial direction against housing 8 by thrust bearing 21. Wobble plate 11 is disposed on the slope of wedge shaped rotor 9 through thrust bearing 10. Bevel gear 12 is attached at the center of wobble plate 11. Bevel gear 12 is geared with bevel gear 14 mounted in hole 1a at the center of casing 1 through steel ball 13. One end of connecting rod 15 is connected to wobble plate 11 at the outer surface of the wobble plate. The other end of connecting rod 15 is connected to piston 16 disposed in cylinder 2. Though not shown in FIG. 5, plural pistons 16 and connecting rods 15 are coupled to wobble plate 11 and disposed in cylinders 2.

Figure 1A:
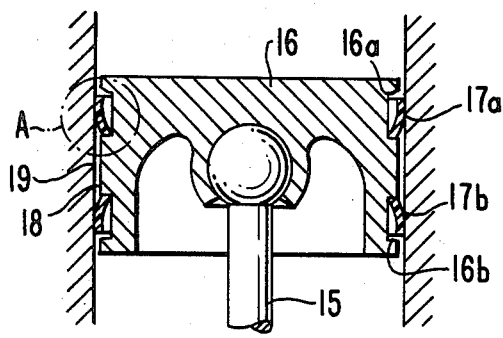
FIG. 1(a) is a cross-sectional view of a piston and cylinder in accordance with the present invention.

Referring to FIGS. 1(a) and (b), each of grooves 16a and 16b is formed on the outer circumferential surface of piston 16. One of the grooves is located near the top of the piston and the other near the bottom. Conical piston ring 17a, with an outer curved surface, is placed in groove 16a with its larger diameter axial end facing the most proximate axial end of piston 16. Conical piston ring 17b is placed in groove 16b with its larger diameter axial end facing the most proximate axial end of piston 16, which is opposite the end faced by conical piston ring 17a. In other words, the larger diameter axial ends of piston rings 17a and 17b face opposite ends of piston 16. Also, the outer diameter of piston rings 17a and 17b is greater than that of piston 16 at normal temperatures.

Figure 2:
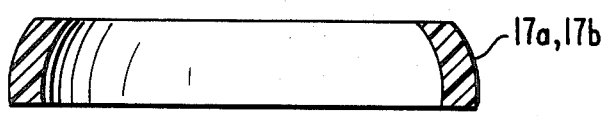
FIG. 2 is an enlarged cross-sectional view of a conical shaped piston ring with a curved surface in accordance with the present invention.

Referring to FIG. 2, the shape of piston rings 17a and 17b is shown. Piston rings 17a and 17b have a conical shape with an outer curved surface. The outer curved surface is convex and has a larger diameter at one axial end than the other so that the piston ring projects laterally. In the preferred embodiment the piston rings are made of plastic, for example, polytetraflourethylene resin.

Figure 3:
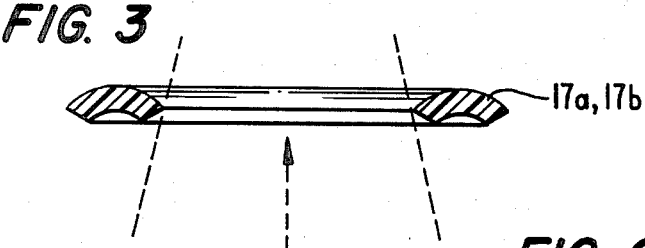
FIG. 3 is an enlarged cross-sectional view of another embodiment of a piston ring with a curved surface in accordance with the present invention.
Figure 6:
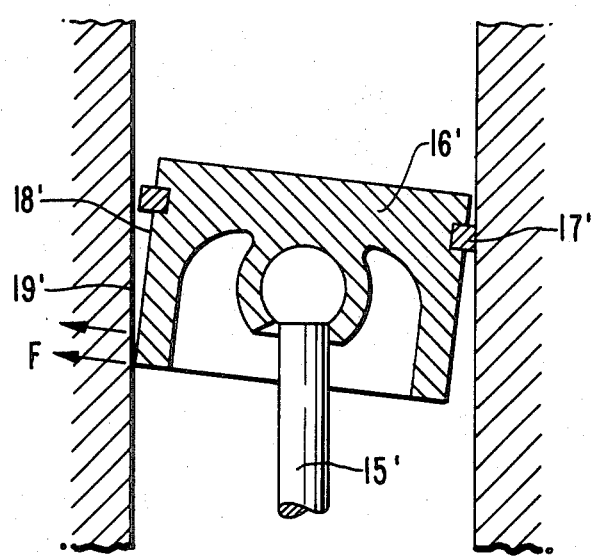
FIG. 6 is a cross-sectional view of a conventional piston and cylinder.

Referring to FIG. 3, an alternative pre-assembly shape for conical piston rings 17a and 17b is shown. In its pre-assembly shape, the inner diameter of conical piston rings 17a and 17b is less than that of the inner surface of grooves 16a and 16b of piston 16. In installing conical piston rings 17a and 17b into grooves 16a and 16b, the inner diameter of conical piston rings 17a and 17b is forced to enlarge to conform to the diameter of the inner surface of grooves 16a and 16b. For example, conical piston rings 17a and 17b are first pressed on a tapered surface in a direction opposite to arrow A in FIG. 3 until the inner diameter expands and the ring takes on a shape similar to the shape of the ring shown in FIG. 2. The enlarged ring of FIG. 3 then is placed on an intermediate cylindrical holder from which it is inserted on the piston in the direction of arrow A. Accordingly, conical piston rings 17a and 17b are placed in grooves 16a and 16b in an almost conical shape with a curved surface projecting toward the outside, much like the piston ring shown in FIG. 2.

Figure 4:
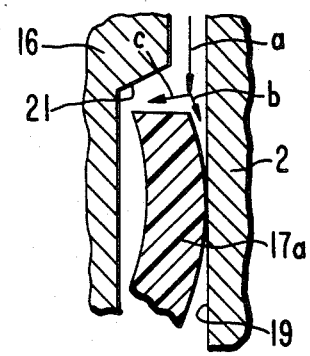
FIG. 4 is an enlarged cross-sectional view to illustrate the operation of a piston ring in accordance with the present invention.

When conical piston rings 17a and 17b of either of the above embodiments of FIGS. 2 and 3, both of which have outer curved surfaces, are placed in grooves 16a and 16b, the outer curved surfaces of these conical piston rings contact the inner surface of cylinder 2 as shown in FIG. 4. Accordingly, the edges of conical piston rings 17a and 17b do not contact the inner surface of cylinder 2. Rather, a smooth surface with a limited contact point is in contact with the wall of cylinder 2 to prevent abrasion between conical piston rings 17a and 17b and the inner surface of cylinder 2.

Figure 1B:
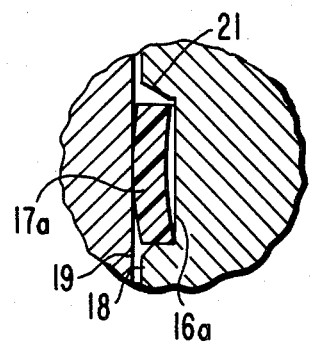
FIG. 1(b) is an enlarged view of portion A in FIG. 1(a).

When piston 16 reciprocates in cylinder 2, the shape and position of curved piston ring 17a disposed in groove 16a prevents refrigerant from leaking from the inside of cylinder 2 to the inside of crank chamber 20. As shown in FIG. 1(b), piston ring 17a is positioned to open toward the outside or closest axial end of piston 16. The piston ring as shown in the figure has a thickness which is significantly less than half the height of the ring. Bevel 21 is positioned along the outermost side of groove 16a of piston 16 Accordingly, during the compression stroke, the gas pressure within cylinder 2 operates against the back surface of piston ring 17a to force the outer curved surface of piston ring 17a against inner wall 19 of cylinder 2. This greatly improves the sealing between piston 16 and cylinder 2 during operation of the piston, particularly in the range between low and middle speed. Piston ring 17b restrains the slanting of piston 16 to help prevent contact between inner surface 19 of cylinder 2 and outer surface 18 of piston 16.

Referring to FIG. 4, the operation of piston ring 17a is shown in greater detail, and is described below in connection with the middle to high speed range. Piston 16 with bevel 21 and piston ring 17a are shown. Compressed fluid normally flows in the direction of arrow (a) and is divided at the top edge of piston ring 17a as shown by arrows (b) and (c) because of the curved shape of piston ring 17a. When the sliding speed of piston 16 changes from middle to high speed, the volume of compressed fluid flowing in the direction of arrow (b) increases so that the volumes of the blow-by gas gradually increases. Therefore, the compression capacity of the compressor maximizes in the range between middle and high speed, and an extreme high pressure does not occur, which prevents loss of horsepower.

The present invention has been described in detail in connection with the preferred embodiments, but these are examples only, and the invention is not restricted thereto. It will be easily understood by those skilled in the art that other variations and modifications can be easily made within the scope of this invention.

We claim:

1. In a refrigerant compressor including a compressor housing having a plurality of cylinders and a crank chamber adjacent said cylinders, a reciprocable piston slidably fitted within each of said cylinders, a driving mechanism coupled to said pistons to move said pistons in a reciprocating motion, a valve plate with valve openings covering one end of said cylinders and a cylinder head covering said valve plate and including a suction chamber and a discharge chamber aligned with said valve openings, the improvement comprising two annular grooves provided toward opposite ends on the outer peripheral surface of each of said pistons and a conical shaped piston ring disposed within each of said annular groove, each said piston ring having an outer diameter larger than the outer diameter of said piston at normal temperatures, each said piston ring having an outer surface facing the wall of the cylinder in which the ring is located and having an inner surface facing toward the center of the piston on which the ring is located, each ring having the outer surface curved convexly in an axial direction and having the inner surface curved concavely in an axial direction, each conical piston ring being curved so that the outer diameter of said curved surface at one end of each of said piston rings is longer than that at the other end to form the base of the conical ring, and wherein one of said piston rings on each piston is disposed on said piston with the base of said conical shaped piston ring facing said valve plate, the thickness of each ring between the inner and outer surfaces being significantly less than half the height of the ring.

2. The refrigerant compressor of claim 1 wherein said conical shaped piston rings are disposed so that the base of each of said piston rings faces the outside or closest axial end of said piston.

3. The refrigerant compressor of claim 1 wherein each of said conical shaped piston rings formed from a toroidal-shaped element having an inner diameter less than the diameter of a bottom surface of said grooves before the toroidal-shaped elements are deformed for placement in said grooves.

4. The refrigerant compressor of claim 1 wherein the annular groove disposed on the outer portion of said piston toward said valve plate has a beveled lip portion facing said cylinder.

5. The refrigerant compressor of claim 1 wherein said piston rings are made of resin.

* * * * *